(12) United States Patent
Mildh et al.

(10) Patent No.: US 9,282,565 B2
(45) Date of Patent: Mar. 8, 2016

(54) RELAY NODE, DONOR RADIO BASE STATION AND METHODS THEREIN

(75) Inventors: Gunnar Mildh, Sollentuna (SE); Jessica Ostergaard, Stockholm (SE); Fredrik Gunnarson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 73 days.

(21) Appl. No.: 14/004,853

(22) PCT Filed: May 17, 2011

(86) PCT No.: PCT/SE2011/050622
§ 371 (c)(1),
(2), (4) Date: Sep. 12, 2013

(87) PCT Pub. No.: WO2012/125095
PCT Pub. Date: Sep. 20, 2012

(65) Prior Publication Data
US 2014/0003328 A1    Jan. 2, 2014

Related U.S. Application Data

(60) Provisional application No. 61/452,256, filed on Mar. 14, 2011.

(51) Int. Cl.
*H04W 72/08* (2009.01)
*H04W 56/00* (2009.01)
(Continued)

(52) U.S. Cl.
CPC ........ *H04W 72/087* (2013.01); *H04W 56/0045* (2013.01); *H04W 72/048* (2013.01); *H04W 84/047* (2013.01)

(58) Field of Classification Search
CPC ............ H04W 76/04; H04W 72/0413; H04W 72/044–72/10
See application file for complete search history.

(56) References Cited

U.S. PATENT DOCUMENTS

2010/0260096 A1    10/2010    Ulupinar et al.
2010/0265873 A1    10/2010    Yi
(Continued)

FOREIGN PATENT DOCUMENTS

WO    2010145556 A1    12/2010

OTHER PUBLICATIONS

LG Electronics Inc.: "Bearer Mapping in Relay Node," 3GPP Draft; R2-092845, 3rd Generation Partnership Project (3GPP), Mobile Competence Centre, 650, route des Lucioles; F-06921 Sophia-Antipolis Cedex; France, no. San Francisco, USA Apr. 28, 2009.
3GPP TSG-RAN WG2 #71: Tdoc R2-104786; Madrid, Spain; Aug. 23-27, 2010; Ericsson, ST-Ericsson, Uu to Un bearer mapping. Whole document; especially Chapter 2.
(Continued)

*Primary Examiner* — Hassan Kizou
*Assistant Examiner* — Ashil Farahmand

(57) ABSTRACT

A donor radio base station and relay node for configuring information associated with radio bearers in a radio communications network. The donor radio base station controls the relay node, which serves a cell and controls a number of first radio bearers over a first radio interface between the relay node and at least one user equipment served in the cell. The donor radio base station further controls a number of second radio bearers over a second radio interface between the donor radio base station and the relay node. The donor radio base station receives characteristic information indicating a characteristic of the relay node, and configures bearer information associated with at least one of the first radio bearers or the second radio bearers based on the indicated characteristic in the received characteristic information. The configured bearer information is utilized in the radio communications network during operation.

13 Claims, 10 Drawing Sheets

(51) Int. Cl.
*H04W 72/04* (2009.01)
*H04W 84/04* (2009.01)

(56) References Cited

U.S. PATENT DOCUMENTS

| | | | |
|---|---|---|---|
| 2011/0235514 A1* | 9/2011 | Huang et al. | 370/235 |
| 2011/0267943 A1* | 11/2011 | Huang et al. | 370/230 |
| 2013/0109399 A1* | 5/2013 | Waz-Ambrozewicz et al. | 455/452.1 |
| 2013/0143574 A1* | 6/2013 | Teyeb et al. | 455/438 |

OTHER PUBLICATIONS

3GPP TSG-RAN WG2 #71: R2-104871; Aug. 23-27, 2010; Madrid, Spain; NTT Docomo, Inc. RN type and Un/Uu configuration. Whole document; especially Chapters 1 and 2.

3GPP TSG-RAN WG2 Meeting#71: R2-104898: Aug. 23-27, 2010; Madrid, Spain; Qualcomm Incorporated. Configuration of Uu to Un bearer mapping. Whole document: especially Chapter 2.2.

3GPP TSG-RAN WG2 Meeting#73; R2-111681; Feb. 21-25, 2011; Taipei, Taiwan; Motorola, Sean Kelley, Reply LS on mapping Uu bearers to Un bearers for relays.

* cited by examiner

RELAY NODE, DONOR RADIO BASE STATION AND METHODS THEREIN

This application claims the benefit of U.S. Provisional Application No. 61/452,256, filed on Mar. 14, 2011, the disclosure of which is fully incorporated herein by reference.

TECHNICAL FIELD

Embodiments herein relate to a relay node, a donor radio base station and methods therein. In particular, embodiments herein relate to configure information associated with radio bearers in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. User equipments (UE) are served in the cells by the respective radio base station and are communicating with respective radio base station over radio bearers. The user equipments transmit data over an air or radio interface to the radio base stations in uplink (UL) transmissions and the radio base stations transmit data over an air or radio interface to the user equipments in downlink (DL) transmissions. Radio bearer here means user plane bearers on Radio Access Network (RAN) level between radio base stations and UEs.

One important aspect with radio communications networks also referred to as wireless networks is to ensure that the radio communications network is simple to deploy and cost efficient to operate. The vision is that the radio communications network shall be self-organizing in as many aspects as possible. Furthermore, good coverage is important when aiming at a mobile broadband experience, both outdoors and indoors. Typically, this coverage is provided via radio base stations covering larger cells, also referred to as macro base stations, with dedicated transport connections, but it is also possible to consider self-backhauling radio base stations also referred to as Relay Nodes (RN) where the same technology is used both for user data between a user equipment and the RN and for the transport connection between the RN and a radio base station with a dedicated transport connection. Backhauling here means the communication between the transport network and the radio base station, and self-backhauling means the communication between the relay and the radio base station.

In LTE-Advanced it has been decided to support "Type 1" RNs. A "type 1" RN comprises some typical characteristics. A "type 1" RN controls one or more cells, each of which appears to the user equipment as a separate cell distinct from the donor cell. The cells have their own Physical Cell ID (PCI) and transmit information on their own synchronization channels, reference symbols etc. In the context of single-cell operation, the user equipment receives scheduling information and Hybrid Automatic Repeat-request (HARQ) feedback directly from the RN and sends information on its control channels to the RN. A "type 1" RN shall appear as a radio base station to legacy user equipments. Thus, the RN is backwards compatible with a radio base station. This means basically that from a user equipment perspective, there is no difference being served by a radio base station or a "type 1" RN.

The RN is connected to the network via a radio interface, called Un interface, to a Donor eNB (DeNB). The DeNB provides backhaul transport for the RN and all the user equipments connected to the RN. The radio protocols used on the Un interface are based on the radio protocols standardized in LTE. There is a "many to many" mapping between UE Evolved Packet System (EPS) bearer and Un radio bearers. This is needed since the RN can at maximum have eight Un radio bearers but can have many more UE EPS bearers depending on how many user equipments are served under the RN.

The detailed mapping of packets from UE EPS bearers to Un bearers in the UL is divided into two steps; First there is a mapping from Quality of Service (QoS) Class Identifier (QCI) associated with the UE EPS bearer to a DiffServ Code Point (DSCP) in the outer Internet Protocol (IP) header of a packet. This mapping is configured by the Operation And Maintenance (OAM) system of the RN. Then there is a mapping from the DSCP to a Un radio bearer with the help of Traffic Flow Templates (TFT) that are signaled from the DeNB to the RN via the Mobility Management Entity (MME) of the RN. This mapping is controlled by the DeNB. The DL mapping is not specified in detail since it is basically internal to the DeNB.

There is currently no support for making it possible to have different radio bearer mapping in the DL in the DeNB for different types of RNs. There is also only limited support for having different bearer mapping in the UL for different RNs, since the RN OAM system can only configure the QCI to DSCP mapping but is not able to configure the mapping between DSCP and Un radio bearers. The OAM system of the relay node is also not able to control the setup and modification of radio bearers, which is controlled by the DeNB. The radio communications network thus shows a nonflexible behavior with a reduced performance as all relay nodes in a cell follow a cell specific mapping.

SUMMARY

An objective of embodiments herein is to provide a mechanism that improves the performance of the radio communications network.

According to an aspect of embodiments herein the object is achieved by a method in a donor radio base station for configuring information associated to radio bearers in a radio communications network. The donor radio base station controls a relay node, which relay node serves a cell. The relay node further controls a number of first radio bearers over a first radio interface between the relay node and at least one user equipment served in the cell. The donor radio base station further controls a number of second radio bearers over a second radio interface between the donor radio base station and the relay node. The donor radio base station and the relay node are comprised in the radio communications network. The donor radio base station receives characteristic information indicating a characteristic of the relay node. Additionally, the donor radio base station configures bearer information associated with at least one of the first radio bearers and/or the second radio bearers based on the indicated characteristic in the received characteristic information. The configured bearer information is to be used in the radio communications network during operation, e.g. during uplink or downlink communication.

According to another aspect the object may be achieved by providing a donor radio base station for configuring information associated to radio bearers in a radio communications network. The donor radio base station is configured to control a relay node. The relay node is configured to serve a cell and to control a number of first radio bearers over a first radio interface between the relay node and at least one user equipment served in the cell. The donor radio base station is further configured to control a number of second radio bearers over a second radio interface between the donor radio base station and the relay node. The donor radio base station comprises a receiving circuit configured to receive characteristic information indicating a characteristic of the relay node. The donor radio base station further comprises a configuring circuit adapted to configure bearer information associated with at least one of the first radio bearers and/or the second radio bearers based on the indicated characteristic in the received characteristic information. The configured bearer information is to be used in the radio communications network during operation.

According to another aspect of embodiments herein the object is achieved by a method in a relay node for enabling configuring of bearer information associated with radio bearers in a radio communications network. The relay node serves a cell and controls a number of first radio bearers over a first radio interface between the relay node and at least one user equipment served in the cell. The donor radio base station serves the relay node and further controls a number of second radio bearers over a second radio interface between the donor radio base station and the relay node. The relay node and donor radio base station are comprised in the radio communications network. The relay node transmits characteristic information indicating a characteristic of the relay node to the donor radio base station or an operation and maintenance node controlling the relay node. The characteristic information enables the donor radio base station to configure bearer information associated with at least one of the first radio bearers and/or the second radio bearers.

According to another aspect the object is achieved by providing a relay node for enabling configuring of bearer information associated with radio bearers in a radio communications network. The relay node is configured to serve a cell and to control a number of first radio bearers over a first radio interface between the relay node and at least one user equipment served in the cell. The donor radio base station is configured to serve the relay node and further to control a number of second radio bearers over a second radio interface between the donor radio base station and the relay node. The relay node comprises a transmitting circuit configured to transmit characteristic information indicating a characteristic of the relay node to the donor radio base station or an operation and maintenance node controlling the relay node. The characteristic information enables the donor radio base station to configure bearer information associated with at least one of the first radio bearers and/or the second radio bearers.

According to embodiments herein it is possible for the donor radio base station to support a so called Relay Node (RN) specific bearer mapping or bearer setup. The RN specific bearer mapping or bearer setup may be based on a certain characteristic or characteristics of the relay node, thus allowing the possibility to support different bearer mapping for different types of relay nodes or group of relay nodes. This in its turn may result in an improved performance of the radio communications network as it is possible to optimize resource usage and experienced QoS of the end user.

BRIEF DESCRIPTION OF THE DRAWINGS

Embodiments will now be described in more detail in relation to the enclosed drawings, in which.

DETAILED DESCRIPTION

Figure 1:
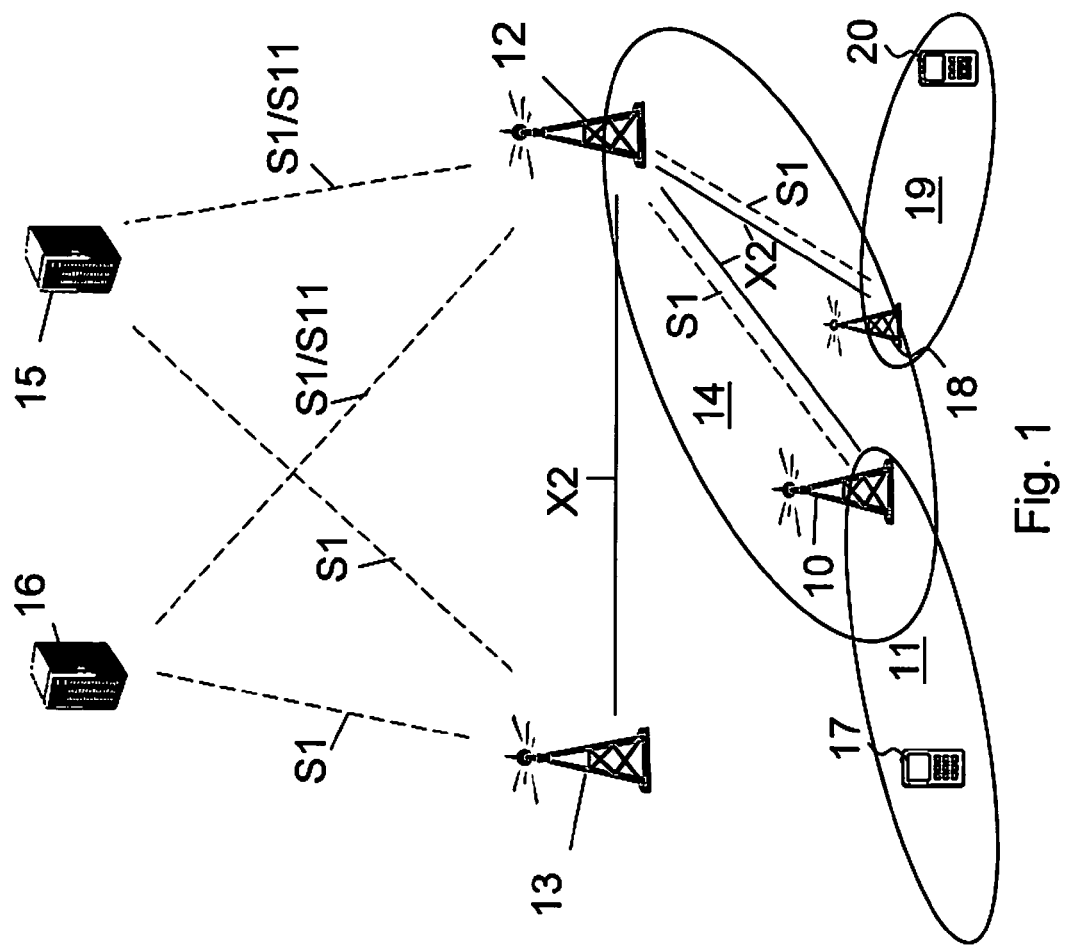
FIG. 1 is a schematic overview depicting a radio communications network.

FIG. 1 is a schematic overview of a radio communications network. Embodiments herein are discussed based on an Evolved Universal Terrestrial Radio Access (E-UTRA) system, which is also commonly referred to as the Long-Term Evolution (LTE) of the widely deployed WCDMA systems but may be implemented in any radio communications network that uses inter radio access network interfaces and intra radio access network interfaces between radio network entities. Inter radio access network interfaces may also be referred to as peer to peer interfaces and intra radio access network interfaces may also be referred to as interfaces terminated in a core network of the radio communications network. However, the figures will relate to the LTE and especially the LTE Advance network architecture. In the example of LTE, X2 is the peer to peer interface between radio base stations with signalling defined by the X2 Application Protocol, and S1 or S11 is the interface terminated in the core network between a radio base station and a core network with signalling defined by the S1 Application Protocol. The radio communication network may use a radio technology, such as LTE, LTE-Advanced, WCDMA, GSM/EDGE, WiMax, or UMB, just to mention a few possible implementations.

The radio communications network comprises a first relay node 10. The first relay node 10 provides radio coverage over a geographical area forming a cell, referred to in the illustrated examples as a first relay cell 11. The radio communications network further comprises a first radio base station 12, and a second radio base station 13. The first radio base station 12 and the second radio base station 13 provide radio coverage over at least one respective geographical area forming a cell. The first radio base station 12 controls a first cell 14. The cell definition may also incorporate frequency bands used for transmissions, which means that two different cells may cover the same geographical area but using different frequency bands. User equipments are served in the cells by the respective radio base station 12,13 and are communicating with respective radio base station 12,13. The user equipments transmit data over an air or radio interface to the radio base stations in UL transmissions and the radio base stations transmit data over an air or radio interface to the user equipments in DL transmissions.

In order to improve coverage of the radio communications network the first relay node 10 is provided, covering, for example, a radio coverage hole, extending the radio coverage, or similar in the radio communications network. Thereby, the first relay node 10 provides improved radio coverage within the radio communications network. The first relay node 10 is served by the first radio base station 12, which is referred to as a donor radio base station 12. The donor radio base station 12 may be connected to the second radio base station 13 over a type of radio network connection e.g. over a peer to peer connection such as an X2 connection. The donor radio base station 12 may be a member of a Mobility Management Entity (MME) pool comprising a first MME 15 as an example of a controlling node. The second radio base station 13 may be a member of a MME pool comprising a second MME 16. Thus, user equipments and relay nodes, e.g. the first relay node 10, controlled by the donor radio base station 12 are controlled by the first MME 15, and user equipments and relay nodes controlled by the second radio base station 13 are controlled by the second MME 16. The donor radio base station 12 may additionally or alternatively be connected to the second radio base station 13 through an interface terminated in the core network over a type of radio network connection, such as a S1 or S11 connection, via the first MME 15 or the second MME 16.

A first user equipment 17 is served by the relay node 10 in the first relay cell 11. The first relay node 10 controls a number of first radio bearers over a first radio interface Uu between the relay node 10 and the first user equipment 17 served in the cell 11. These first radio bearers may be referred to as Uu bearers in LTE. The donor radio base station 12 controls a number of second radio bearers over a second radio interface Un between the donor radio base station 12 and the relay node 10. These second radio bearers may be referred to as Un bearers in LTE. There is a General Packet Radio Service (GPRS) Tunneling Protocol (GTP) tunnel associated with each UE EPS bearer, that is a first radio bearer, spanning from a Serving-Gateway associated with the user equipment 17,20 to the donor radio base station 12, which is switched to another GTP tunnel in the donor radio base station 12, going from the donor radio base station 12 to the relay node 10,18, one-to-one mapping. User plane packets, that is packets communicated between user equipments, or user equipments and a radio base station, over the first radio bearers are mapped to second radio bearers over the Un interface. The mapping can be based on the QoS Class Identifier (QCI) associated with the UE Evolved Packet System (EPS) bearer. UE EPS bearer with similar QoS may be mapped to the same Un radio bearer R2.

The radio communications network further comprises a second relay node 18. The second relay node 18 is also served by the donor radio base station 12. The second relay node 18 provides radio coverage over a geographical area forming a second relay cell 19. The second relay node 18 serves a second user equipment 20 in the second relay cell 19.

It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell.

The respective radio base station 12,13 may also be referred to as e.g. a NodeB, an evolved Node B (eNB, eNode B), a base transceiver station, Access Point Base Station, base station router, or any other network unit capable to communicate with a user equipment within the cells served by the respective radio base station 12,13 depending e.g. of the radio access technology and terminology used.

The first relay node 10 is e.g. a relay node with the characteristics of providing public access to the radio communications network to user equipments within a shopping center or similar. The second relay node 18 is e.g. a relay node providing access to the radio communications network for user equipments with a restricted access, such as a home relay node.

According to embodiments herein the donor radio base station 12 is informed about a characteristic or characteristics, referred herein to as a characteristic, of the first relay node 10 and the second relay node 18. The donor radio base station 12 then configures bearer information based on the characteristic of respective relay node 10,18. The bearer information is related to or associated with radio bearers within the radio communications network, i.e. at least one of a first radio bearer or a second radio bearer. The bearer information may e.g. comprise a mapping scheme indicating a mapping of packets to radio bearers in the UL or DL, also referred to as 'mapping radio bearers', and/or bearer setup information such as number of radio bearers used between the donor radio base station 12 and the relay node 10, and/or a set Quality of Service value associated with radio bearers towards the user equipment 17,20. The mapping scheme may be a Traffic Flow Template (TFT) where mapping from DSCP in the outer head of an IP packet to a Un bearer is comprised.

For example, the donor radio base station 12 configures, e.g. determines and generates, bearer information such as mapping of radio bearers of the first relay node 10 to provide 'best effort'-quality in a public spot, e.g. radio bearers towards the first user equipment 17 is associated with a low QoS value and packets are mapped to radio bearers with the low QoS value. The donor radio base station 12 may further configure bearer information such as mapping of radio bearers to the second relay node 18. The bearer information is different than the bearer information related to the first relay node 10 as the characteristic of the second relay node 18 is different than the characteristic of the first relay node 10. The second relay node 18 is subscribing to a service with a high QoS value and the donor radio base station 12 configures bearer information providing high QoS value to the second user equipment 20.

The donor radio base station 12 may either implement the configured bearer information in the donor radio base station 12, e.g. in the DL, or transmit the configured bearer information to the relay node 10, for the relay node to implement the configuration, e.g. in the UL.

Having the possibility to configure different mapping of radio bearers for different types of relay nodes may be beneficial in case different relay node types have different QoS requirements.

For example, as an alternative to the illustrated example, a home deployed relay node, e.g. the second relay node 18, may have lower requirements on QoS differentiation than a relay node deployed in public or at a corporate site, e.g. the first relay node 10, and therefore may require a different mapping of radio bearers. Embodiments herein provide a mechanism making it possible for the donor radio base station 12 to know which relay node is e.g. a home relay node, and which relay node is e.g. a public or corporate relay node. The donor radio base station 12 configures the bearer information and thus controls the mapping, and the setup and modification of the radio bearers or Evolved Packet System (EPS) bearers between the respective relay node 10,18 and donor radio base station 12 based on the type of the relay node.

Figure 2:
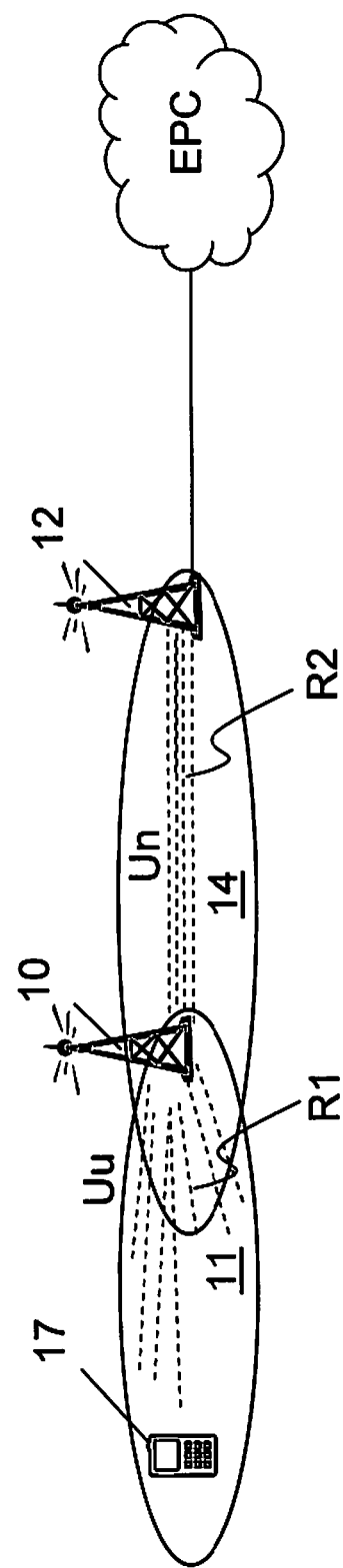
FIG. 2 is a schematic overview depicting a radio communications network.

FIG. 2 is a schematic overview of the radio communications network. The donor radio base station 12 receives the characteristic information disclosing the characteristic of the first relay node 10. This characteristic information may comprise information about type, capability and/or capacity of the first relay node 10, such as information about size of the cell 11, output pilot or reference symbol power, cell range, the type of deployment, the intended type or amount of traffic in the cell 11, the desired quality of service value to be provided to user equipments behind the relay node 10, the relay node subscription and related quality of service value, if the cell 11 is open or closed access, and/or that the cell 11 is used at home, in public, or at corporate. This characteristic information may be received from the first relay node 10 over a radio interface, e.g. Un interface. The donor radio base station 12 further configures bearer information associated with the radio bearers, e.g. mapping second radio bearers R2, such as Un radio bearers, to first radio bearers R1, such as UE EPS bearers. There may be a "many-to-many" mapping between UE EPS bearer R1 and Un radio bearers R2, since the first relay node 10 may at maximum have eight Un radio bearers R2 but may have many more UE EPS bearers R1 depending on how many user equipments are served under the first relay node 10.

As stated above, the detailed mapping of packets from UE EPS bearers R1 to Un bearers R2 in the UL is divided into two steps. First there is a mapping from QoS Class Identifier (QCI) associated with the UE EPS bearer R1 to a DiffServ Code Point (DSCP) in the outer Internet Protocol (IP) header of a packet. This mapping is configured by an Operation and Maintenance (OAM) system of the first relay node 10. Then there is a mapping from the DSCP to a Un radio bearer R2 with the help of Traffic Flow Templates (TFT) that are signaled from the donor radio base station 12 to the first relay node 10 via for example an OAM node or the first MME 15 of the first relay node 10. This mapping is controlled by the donor radio base station 12 as well as the setup and modification of Un radio bearers R2.

According to embodiments herein, the donor radio base station 12 takes the characteristic of the first relay node into account when configuring bearer information associated with radio bearers, which configured bearer information is to be used in the radio communications network during operation. The donor radio base station 12 transmits the configured bearer information, e.g. a TFT and bearer configuration, to the first relay node 10. The TFT may comprise information regarding a mapping scheme indicating a mapping of UL packets over radio bearers and the bearer configuration may comprise number of radio bearers used, and/or a set Quality of Service value of the radio bearers. Similarly the donor radio base station 12 may internally apply a specific mapping scheme for DL packets taking the characteristic of the first relay node 10 into account. Thereby, different radio bearer configurations and UL/DL packet mapping are achieved for relay nodes of different characteristics, resulting in a radio communication network that is more efficient with improved performance.

Figure 3:
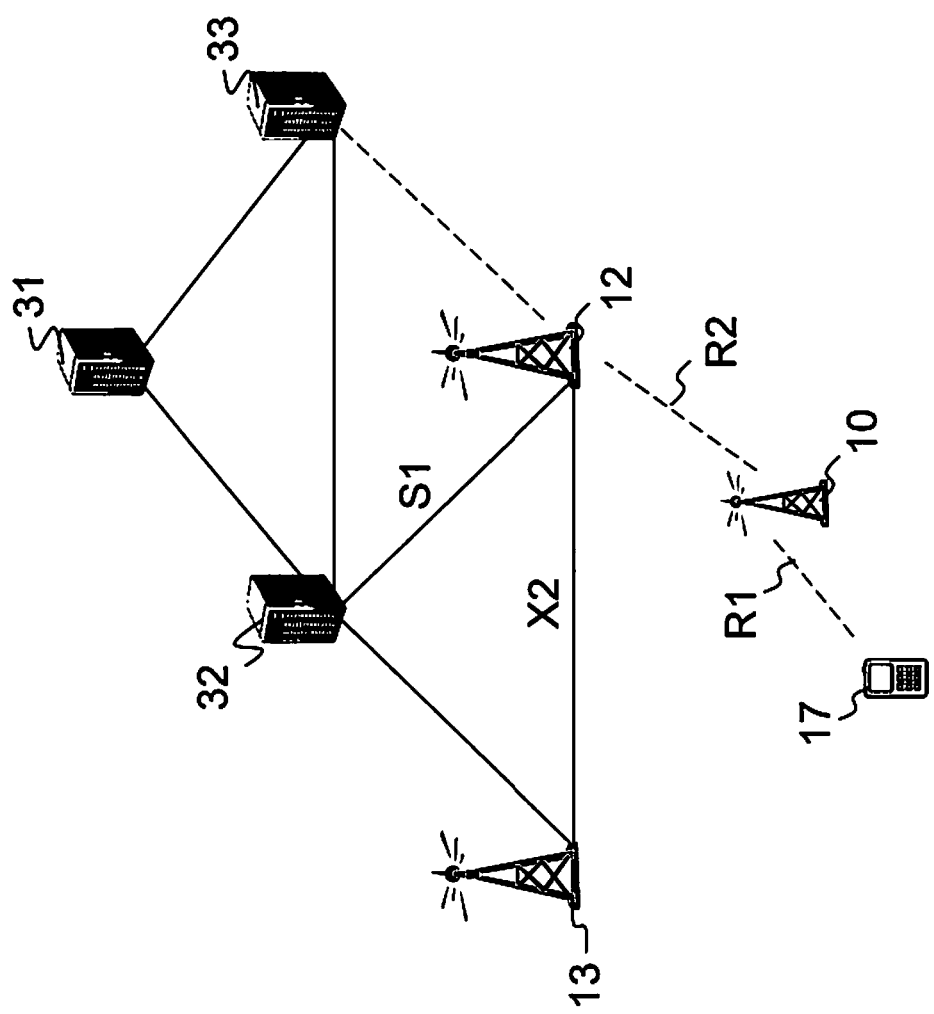
FIG. 3 is a schematic overview depicting a radio communications network.

FIG. 3 is a schematic overview of a radio communications network, describing a situation when the first relay node 10 and the donor radio base station 12 are from different vendors, i.e. different operators or manufacturers. From the top, the network may be managed by a Network Management (NM) system 31 handling equipment from all vendors via a standardized Itf-N interface. Equipment from each vendor is handled by one or several Domain Management (DM) systems, sometimes stated to include Element Management (EM), each node being an example of an OAM node. Such systems are also referred to as OSS systems. These systems manage Network Elements (NE) which may be radio base stations and relay nodes, but also other elements. In LTE, the first relay node 10 in the radio communications network is controlled as any user equipment by a radio resource control (RRC) protocol. Radio bearers are also set up to carry X2 and S1 traffic between the first relay node 10 and its donor radio base station 12, as well as to carry OAM traffic between first relay node 10 and its DM/EM. In the illustrated example, the donor radio base station 12 is managed by an operation and maintenance node referred to as a first DM/EM 32 that is different from an operation and maintenance node referred to as a second DM/EM 33 managing the first relay node 10. If the donor radio base station 12 and the first relay node 10 are from the same vendor, both node types may be managed by the same DM/EM.

The donor radio base station 12 configures bearer information associated with radio bearers based on a characteristic of the first relay node 10. The configured bearer information is to be used in the radio communications network during operation. As stated above, the bearer information may be associated with radio bearers over a first radio interface between the first relay node 10 and the user equipment 17, which radio bearers are herein referred to as first radio bearers R1. Alternatively or additionally, the bearer information may be associated with radio bearers over a second radio interface between the donor radio base station 12 and the first relay node 10 also referred to as second radio bearers R2.

The donor radio base station 12 may receive the characteristic information indicating a characteristic of the relay node 10 from different sources as will be described below.

Figure 4:
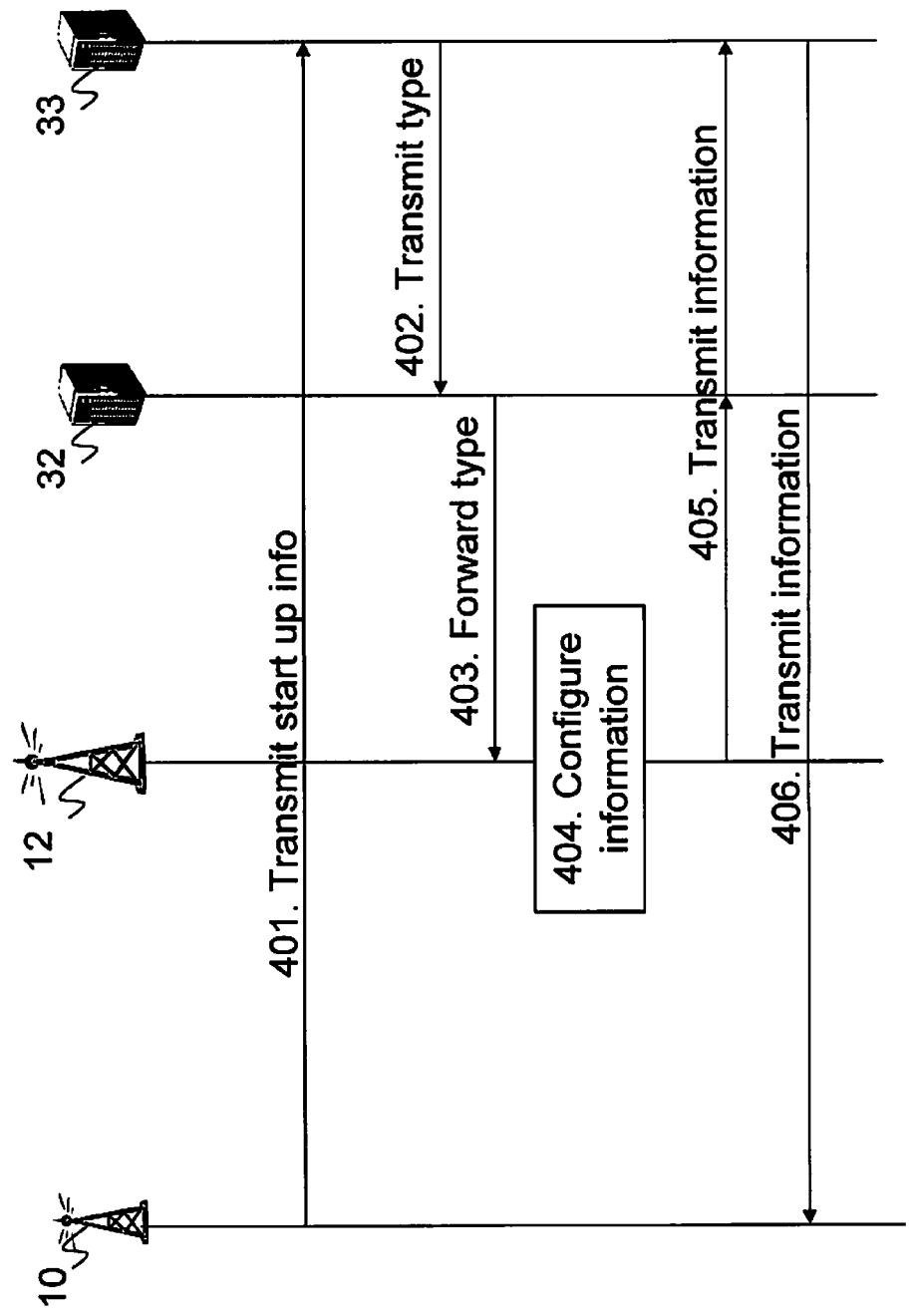
FIG. 4 is a schematic combined flowchart and signalling scheme in a radio communications network.

FIG. 4 is a combined flowchart and signalling scheme describing a situation when the first relay node 10 and the donor radio base station 12 are from different vendors or manufacturers.

Step 401. The first relay node 10 transmits startup information to the second DM/EM 33, since the second DM/EM 33 controls the first relay node 10, when contacting its OAM system as part of a relay node startup procedure. Such startup information may comprise initial identities, characteristics, hardware certificates etc. identifying the first relay node towards the OAM system, and may be transmitted in a plurality of messages.

Step 402. The second DM/EM 33 transmits a signaling message which includes characteristic information about a characteristic of the first relay node 10, in the illustrated example the type of the first relay node 10, to the first DM/EM 32 since the donor radio base station 12 is controlled by the first DM/EM 32. The signaling message may be sent via NM 31 and Itf-N, directly to the first DM/EM 32 via Itf-Peer to Peer (P2P). It should be noted that in the case that the first relay node 10 and the donor radio base station 12 both are handled by the same DM/EM system of the same vendor the signaling message may be transferred internally of the same DM/EM.

The first relay node 10 may be identified by including the Enhanced Cell Global Identity (ECGI) of the first relay node 10 in the signaling message or ECGIs in case the first relay node 10 serves more than one cell. The transmitted characteristic information may comprise information about type, capability or capacity of the first relay node 10 such as a cell size of the first relay cell 11, e.g. output pilot or reference symbol power, cell range etc.; the type of deployment e.g. indoor or outdoor; if the cell has open or closed access; what the first relay cell 11 is used for e.g. home, public, corporate, etc. The characteristic information may additionally or alternatively comprise a generic pointer pointing to a pre-configured type or mapping of radio bearers in the donor radio base station 12. In the latter case the pre-configuration may be configured by the OAM system of the donor radio base station, e.g. the first DE/EM 32, or hard coded into the donor radio base station 12.

Step 403 The first DM/EM 32 forwards a message comprising the type of relay node to the donor radio base station 12 and thereby informs the donor radio base station 12 about the type of the first relay node 10. The first relay node 10 may be identified by including ECGI or ECGIs of the first relay node 10 in the message, which ECGI is used by the donor radio base station 12 to associate the type of relay node to the correct relay node, i.e. the first relay node 10. This association information may be stored at the donor radio base station 12.

Step 404. When the donor radio base station 12 receives the message, the donor radio base station 12 configures bearer information associated with radio bearers based on the type of relay node indicated in the received characteristic information, which configured bearer information is to be used in the radio communications network during operation. For example, the donor radio base station 12 decides on a suitable mapping of radio bearers, number of radio bearers, and/or QoS properties, based on the characteristic information in the received message. Number of radio bearers, and/or QoS properties may also be referred to as bearer realization or bearer setup. For example, the donor radio base station 12 may have been informed during configuration which mapping a certain type of relay node should perform, and use this mapping based on the type in the received characteristic information.

This enables a mechanism to have different mapping of radio bearers, number of radio bearers, and/or QoS properties for different relay nodes or group of relay nodes, adapted to the characteristic of the first relay node 10.

Step 405. The donor radio base station 12 may transmit the configured bearer information, in case the configured bearer information concerns UL, to the second DM/EM 33 via the first DM/EM 32 and/or the NM 31.

Step 406. The second DM/EM 33 may then transmit the configured bearer information to the first relay node 10 during updating, upon request or configuration.

Alternatively, the donor radio base station 12 may transmit the configured bearer information directly to the relay node 10 or via a controlling node controlling the first relay node 10 e.g. the first MME 15.

In case the configured bearer information concerns DL, the configured bearer information, e.g. mapping of radio bearers, number of radio bearers, and/or QoS properties, is implemented in the donor radio base station 12 omitting the steps 405 and 406.

Figure 5:
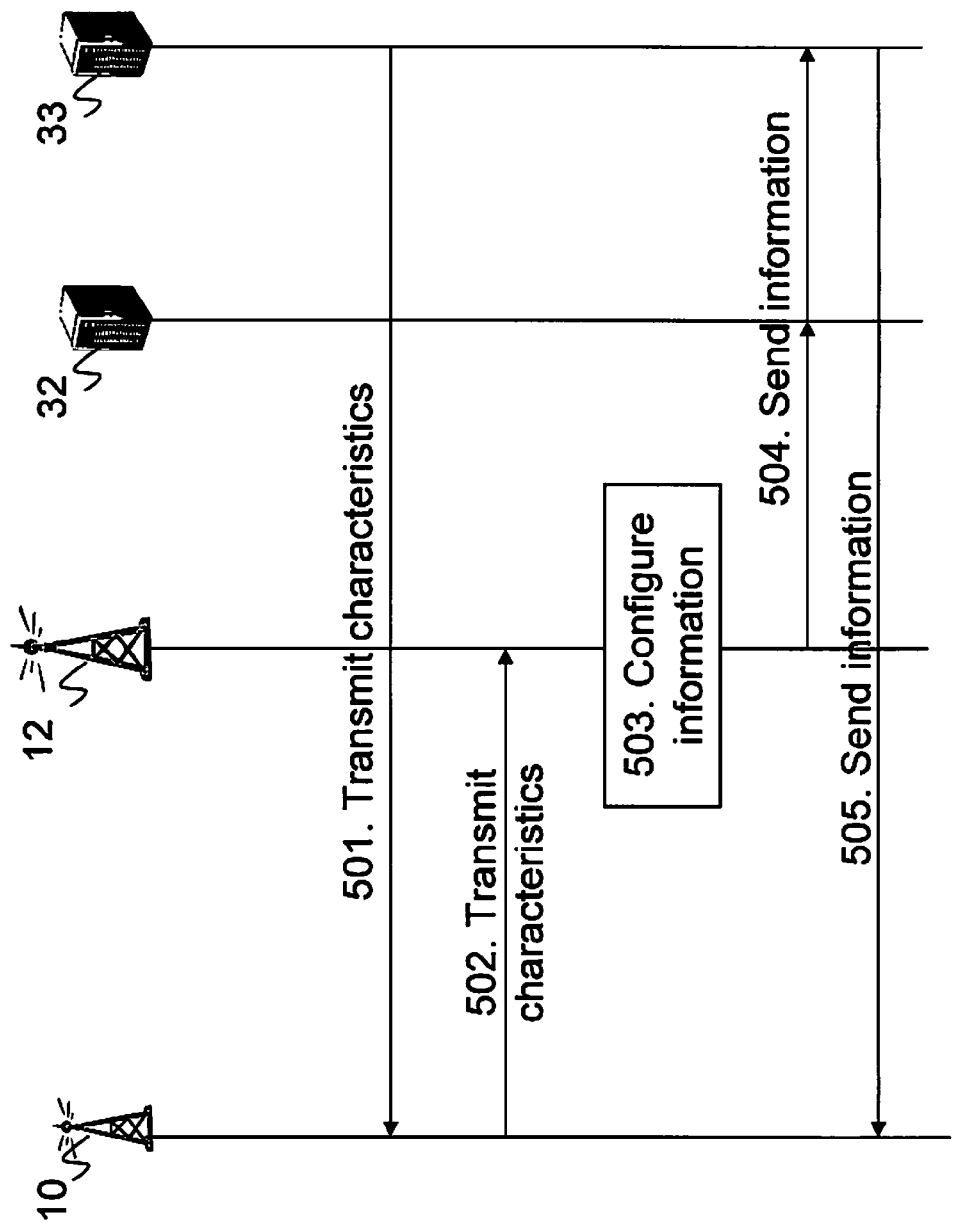
FIG. 5 is a schematic combined flowchart and signalling scheme in a radio communications network.

FIG. 5 is a combined flowchart and signaling scheme describing a situation when the first relay node 10 and the donor radio base station 12 are from different vendors, where the donor radio base station 12 may receive the characteristic information indicating a characteristic of the relay node 10 from a different source than in FIG. 4.

Step 501. In some embodiments, the second DM/EM 33 transmits the characteristic to the first relay node 10. Thus, the first relay node 10 may receive a configuration message from its OAM system, e.g. the second DM/EM 33, indicating the characteristic of the first relay node 10. As stated above, the characteristic may include information about type, capability and/or capacity, exemplified above.

Step 502. The first relay node 10 transmits a signaling message to the donor radio base station 12, which signaling message indicates the characteristic of the first relay node 10 received from the second DM/EM 33. The signaling message may be part of other procedures such as RRC connection setup, S1 or X2 setup, OAM setup etc. The signaling message may be coded as an RRC, S1-AP, X2-AP, etc. message. The signaling message may be encoded in the ECGI of the first relay cell 11, e.g. by associating the type of the first relay node 10 to a specific set of cell identifiers, e.g. a cell identifier range. The first relay node 10 may transmit the ECGI to the donor radio base station 12 as part of the X2 setup between donor radio base station 12 and the first relay node 10.

Step 503. When the donor radio base station 12 receives the message, the donor radio base station 12 configures the bearer information associated with radio bearers based on the characteristic indicated in the received characteristic information. The configured bearer information is to be used in the radio communications network during operation for communication. For example, the donor radio base station 12 configures, e.g. decides, on a suitable mapping of radio bearers, number of radio bearers, and/or QoS properties, based on the characteristic information in the received message. The donor radio base station 12 may e.g. have been informed during configuration which mapping a certain type of relay node should perform, and use this mapping based on the type in the received characteristic information.

This enables embodiments herein to have different mapping of radio bearers, number of radio bearers, and/or QoS properties for different relay nodes or group of relay nodes, adapted to the characteristic of different relay nodes. Step 503 corresponds to step 404 in FIG. 4.

Step 504. The donor radio base station 12 may transmit the configured bearer information to the second DM/EM 33 via the first DM/EM 32 and/or the NM 31. The step 504 corresponds to the step 405 in FIG. 4.

Step 505. The second DM/EM 33 may transmit the configured bearer information to the first relay node 10. The step 505 corresponds to the step 406 in FIG. 4.

Alternatively, the donor radio base station 12 may transmit the configured bearer information directly to the relay node 10 or via a controlling node controlling the first relay node 10 e.g. the first MME 15.

As FIG. 4 also FIG. 5 illustrates the case where the configured bearer information concerns the UL. In the case of bearer information regarding DL, the configured bearer information is implemented in the donor radio base station 12 and thus steps 504 and 505 are not performed.

Figure 6:
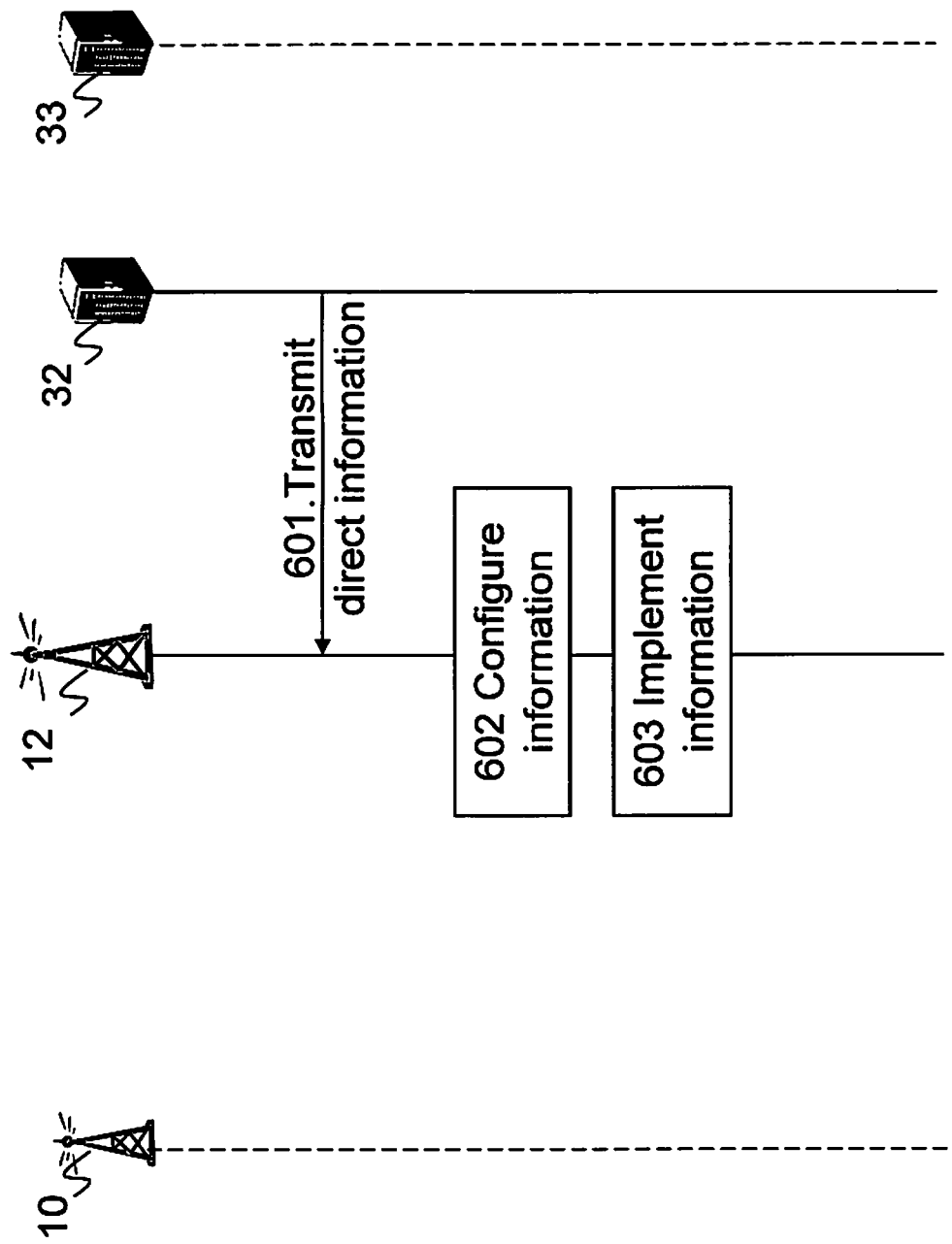
FIG. 6 is a schematic combined flowchart and signalling scheme in a radio communications network.

FIG. 6 is a combined flowchart and signaling scheme describing a situation when the first relay node 10 and the donor radio base station 12 are from different vendors, and where the donor radio base station 12 may receive the characteristic information indicating a characteristics of the relay node 10 from a different source than in FIG. 4 and FIG. 5. Also, the characteristic information indicating the characteristic in the illustrated example of FIG. 6 comprises direct information about suggested or suitable, herein referred to as suggested, mapping scheme indicating a mapping of packets over radio bearers, number of second radio bearers R2 used, and/or a set Quality of Service value of the second radio bearers R2. Direct information herein means that an actual suggested mapping scheme, number of second radio bearers R2, such as Un bearers, and/or a set Quality of Service value of the second radio bearers R2 is comprised in the direct information.

As stated above, the donor radio base station 12 controls a number of second radio bearers R2 towards the first relay node 10 and the first relay node 10 controls a number of first radio bearers R1 towards user equipments served by the first relay node 10.

Step 601. The first DM/EM 32 may transmit a signaling message to the donor radio base station 12. The signaling message comprises the direct information. This direct information may be generated by an OAM node, e.g. the first DM/EM 32, or a network planning system and may be sent to the donor radio base station 12 either via the OAM node, e.g. the first DM/EM 32, or via the first relay node 10. Also the second DM/EM 33 may generate such direct information and may transmit the direct information via the first relay node 10 or the first DM/EM 33 during e.g. configuration of the first relay node 10.

Alternatively, this direct information may also be generated by the first relay node 10 based on information about the characteristic stored on the first relay node 10 and then transferred to the donor radio base station 12. The direct information may then be transferred either directly as described in FIG. 5 or via the OAM system of the first relay node 10 and the OAM system of the donor radio base station 12, e.g. via the second DM/EM 33 and the first DM/EM 32, as described in FIG. 4. Thus, the donor radio base station 12 receives the signaling message.

Step 602. The first relay node 10 may be identified in the signaling message by its ECGI if the direct information is conveyed via the first DM/EM 32. The donor radio base station 12 uses the received direct information when configuring information associated with radio bearers or at least it takes the direct information into account when configuring bearer information associated with radio bearers. The donor radio base station 12 may have been informed during configuration which mapping a certain type of relay node should perform, and use this in combination with the direct information.

Step 603. As the illustrated example regards the DL, the donor radio base station 12 implements the configured bearer information. For example, the donor radio base station 12 configures a mapping scheme in the DL and performs mapping of packets received at the donor radio base station 12 to the second radio bearers R2, number of second radio bearers R2 used, and/or a set QoS value of the second radio bearers R2. For example, the packets received in the donor radio base station 12 are associated with some UE bearers which the donor radio base station 12 is aware of. These "UE bearers" have different QoS configuration assigned to them, thus it is possible to map them to some second radio bearers R2 with similar QoS. Another example is that packets received at the donor radio base station 12 have some "marking" or associated with some IP/User Datagram Protocol (UDP)/GTP tunnels, and that this marking/tunnels is used to map them to the second radio bearers R2 with a similar QoS.

It should be understood that the other characteristic information exemplified in the other figures may be sent in a similar manner as the direct information in FIG. 6.

Figure 7:
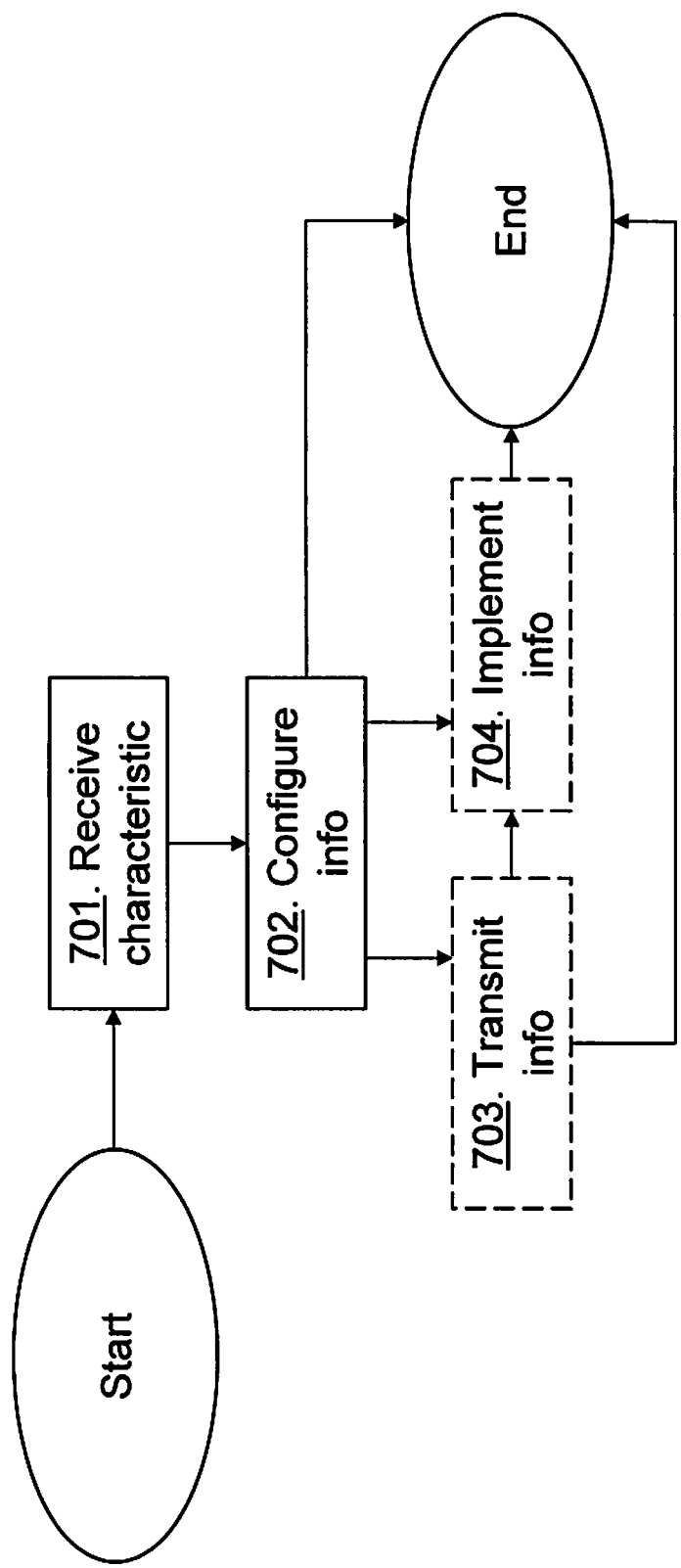
FIG. 7 is a flowchart of a method in a donor radio base station.

The method steps in the donor radio base station 12 for configuring information associated to radio bearers according to some general embodiments will now be described with reference to a flowchart depicted in FIG. 7. The donor radio base station 12 controls the relay node 10, referred to above as the first relay node 10, and which relay node 10 serves a cell 11, referred to above as the first relay cell 11. The relay node 10 controls a number of first radio bearers R1 over a first radio interface between the relay node 10 and at least one user equipment 17 served in the cell 11. The donor radio base station 12 further controls a number of second radio bearers R2 over a second radio interface between the donor radio base station 12 and the relay node 10. The donor radio base station 12 and the relay node 10 are comprised in the radio communications network. The steps do not have to be taken in the order stated below, but may be taken in any suitable order.

Step 701. The donor radio base station 12 receives characteristic information indicating the characteristic of the relay node 10. The indicated characteristic may in some embodiments comprise information about type, capability of the relay node 10 and/or capacity of the relay node 10, e.g. size of the cell 11, output pilot or reference symbol power, cell range or cell 11, the type of deployment, the intended type or amount of traffic in the cell 11, the desired quality of service value to be provided to user equipments behind the relay node 10, the relay node subscription and related quality of service value, if the cell 11 has open or closed access, and/or that the cell 11 is used at home, in public, or at corporate. The characteristic information may be indicating a certain type of relay node out of a number of types of relay nodes.

The received characteristic information may alternatively or additionally indicate the characteristic of the relay node 10 by comprising a suggested mapping scheme for mapping a data packet carried over a first radio bearer R1 to a second radio bearer R2, or for mapping a data packet carried towards a user equipment to a second radio bearer R2, number of second radio bearers R2 used, and/or a set Quality of Service value of the second radio bearers R2. This may be received from an operation and maintenance node such as the first DM/EM 32, a network planning node, or the relay node 10.

The received characteristic information may in some embodiments comprise a generic pointer to a pre-configured relay node type or mapping of radio bearers stored in the donor radio base station 12. The stored mapping of radio bearers may be pre-configured or configured by an operation and maintenance system, or hard coded into the donor radio base station 12.

The received characteristic information may be received from the relay node 10 or from an operation and maintenance node, such as the first DM/EM 32. The operation and maintenance node controls the donor radio base station 12. This step corresponds to step 403 in FIG. 4, step 502 in FIG. 5, and step 601 in FIG. 6.

Step 702. The donor radio base station 12 configures bearer information associated with at least one of the first radio bearers R1 and/or the second radio bearers R2 based on the indicated characteristic in the received characteristic information. The configured bearer information is to be used in the radio communications network during operation. For example, if the received characteristic of the relay node 10 indicates a home radio base station, the donor radio base station may configure a mapping of a first radio bearer R1 associated with a first QoS value with a second radio bearer R2 associated with a second QoS value, and mapping of a packet associated with a QoS value from a transport network to a second radio bearer R2 associated with a QoS of a first radio bearer R1. Thus, the bearer information may regard the mapping of radio bearers involving mapping packets from the DSCP to a Un radio bearer, alternatively or additionally, mapping of QoS of user equipment to QoS of a transport network. The donor radio base station 12 may configure a first bearer information for a first relay node 10 and a second bearer information for a second relay node 18 with a different characteristic in the cell 14 of the donor radio base station 12. This step corresponds to step 404 in FIG. 4, step 503 in FIG. 5, and step 602 in FIG. 6.

Step 703. The donor radio base station 12 may transmit the configured bearer information to the relay node 10, to an operation and maintenance node, such as the second DM/EM 33, or a controlling node, such as the first MME 15, controlling the relay node 10. The configured bearer information may comprise a mapping scheme indicating a mapping of packets over first radio bearers R1 to second radio bearers R2, number of second radio bearers R2 used, and/or a set Quality of Service value of the second radio bearers R2. The configured bearer information may be transmitted directly to the relay node 10 or via the operation and maintenance node, such as the second DM/EM 33 or via the controlling node 15. This step is performed in some embodiments as indicated by the dashed line. This step corresponds to step 405 in FIG. 4 and step 504 in FIG. 5.

Step 704. Alternatively or additionally, the donor radio base station 12 may implement the configured bearer information in the donor radio base station 12. The configured bearer information comprises a mapping scheme indicating a mapping of packets received at the donor radio base station 12 to the second radio bearers R2, number of second radio bearers R2 used, and/or a set Quality of Service value of the second radio bearers R2. This step is performed in some embodiments as indicated by the dashed line. This step is exemplified in step 603 in FIG. 6.

Figure 8:
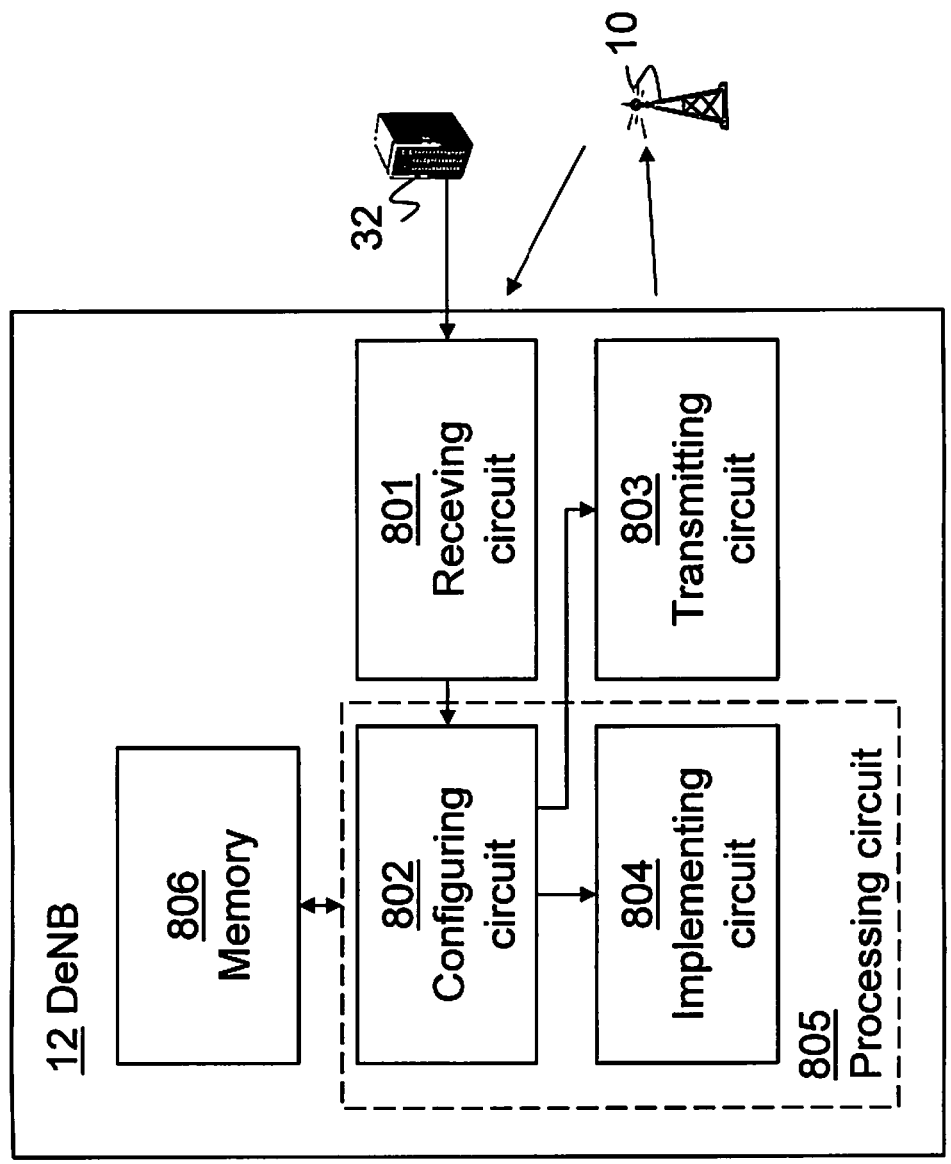
FIG. 8 is a block diagram depicting a donor radio base station.

In order to perform the method steps for configuring information associated to radio bearers the donor radio base station 12 comprises an arrangement depicted in FIG. 8. The donor radio base station 12 is configured to control the relay node 10, which relay node 10 serves a cell 11. The relay node 10 controls a number of first radio bearers R1 over a first radio interface between the relay node 10 and at least one user equipment 17 served in the cell 11. The donor radio base station 12 is further configured to control a number of second radio bearers R2 over a second radio interface between the donor radio base station 12 and the relay node 10.

The donor radio base station 12 comprises a receiving circuit 801 configured to receive characteristic information indicating the characteristic of the relay node 10. The indicated characteristic may in some embodiments comprise information about capability of the relay node 10 or capacity of the relay node 10, e.g. size of the cell 11, output pilot or reference symbol power, cell range or cell 11, the type of deployment, the intended type or amount of traffic in the cell 11, the desired quality of service value to be provided to user equipments behind the relay node 10, the relay node subscription and related quality of service value, if the cell 11 has open or closed access, and/or that the cell 11 is used at home, in public, or at corporate. The characteristic information may indicate a certain type of relay node out of a number of types of relay nodes. The received characteristic information may alternatively or additionally indicate the characteristic of the relay node 10 by comprising a suggested mapping scheme for mapping a data packet carried over a first radio bearer R1 to a second radio bearer R2, or for mapping a data packet carried towards a user equipment to a second radio bearer R2, number of second radio bearers R2 used, and/or a set Quality of Service value of the second radio bearers R2. This may be received from an operation and maintenance node 15, 32, network planning node, or the relay node 10. The received characteristic information may in some embodiments comprise a generic pointer to a pre-configured relay node type or mapping of radio bearers stored in the donor radio base station 12. The stored mapping of radio bearers may be pre-configured or configured by an operation and maintenance system, or hard coded into the donor radio base station 12. The received characteristic information may be received from the relay node 10 or from an operation and maintenance node 32. The operation and maintenance node 15, 32 controls the donor radio base station 12.

Furthermore, the donor radio base station 12 comprises a configuring circuit 802 adapted to configure bearer information associated with at least one of the first radio bearers R1 and/or the second radio bearers R2 based on the indicated characteristic in the received characteristic information. The configured bearer information is to be used in the radio communications network during operation.

In some embodiments the donor radio base station 12 may comprise a transmitting circuit 803 configured to transmit the configured bearer information to the relay node 10, to an operation and maintenance node 33 or a controlling node 15, controlling the relay node 10. The configured bearer information may comprise a mapping scheme indicating a mapping of packets over first radio bearers R1 to second radio bearers R2, number of second radio bearers R2 used, and/or a set Quality of Service value of the second radio bearers R2. The configured bearer information may be transmitted directly to the relay node 10 or to the operation and maintenance node 33, or the controlling node 15. The association between the characteristic and the relay node 10 may be stored in the donor radio base station on e.g. the memory 805.

The donor radio base station 12 may further comprise an implementing circuit 804 configured to implement the configured bearer information in the donor radio base station 12. The configured bearer information comprises a mapping scheme indicating a mapping of packets received at the donor radio base station 12 to the second radio bearers R2, number of second radio bearers R2 used, and/or a set Quality of Service value of the second radio bearers R2.

The embodiments herein for configuring information associated to radio bearers may be implemented through one or more processors, such as a processing circuit 805 in the donor radio base station depicted in FIG. 8, together with computer program code for performing the functions and/or method steps of the embodiments herein. The program code mentioned above may also be provided as a computer program product, for instance in the form of a data carrier carrying computer program code for performing the present solution when being loaded into the donor radio base station 12. One such carrier may be in the form of a CD ROM disc. It is however feasible with other data carriers such as a memory stick. The computer program code may furthermore be provided as pure program code on a server and downloaded to the donor radio base station 12.

Furthermore, the donor radio base station 12 may comprise a memory 806. The memory 806 may comprise one or more memory units and may be used to store for example data such as radio bearer information, such as mapping info, UE EPS bearers to DSCP and DSCP to Un bearers, QoS values, characteristic information, stored associations of characteristics and bearer information, application to perform the methods herein when being executed on the donor radio base station 12 or similar.

Figure 9:
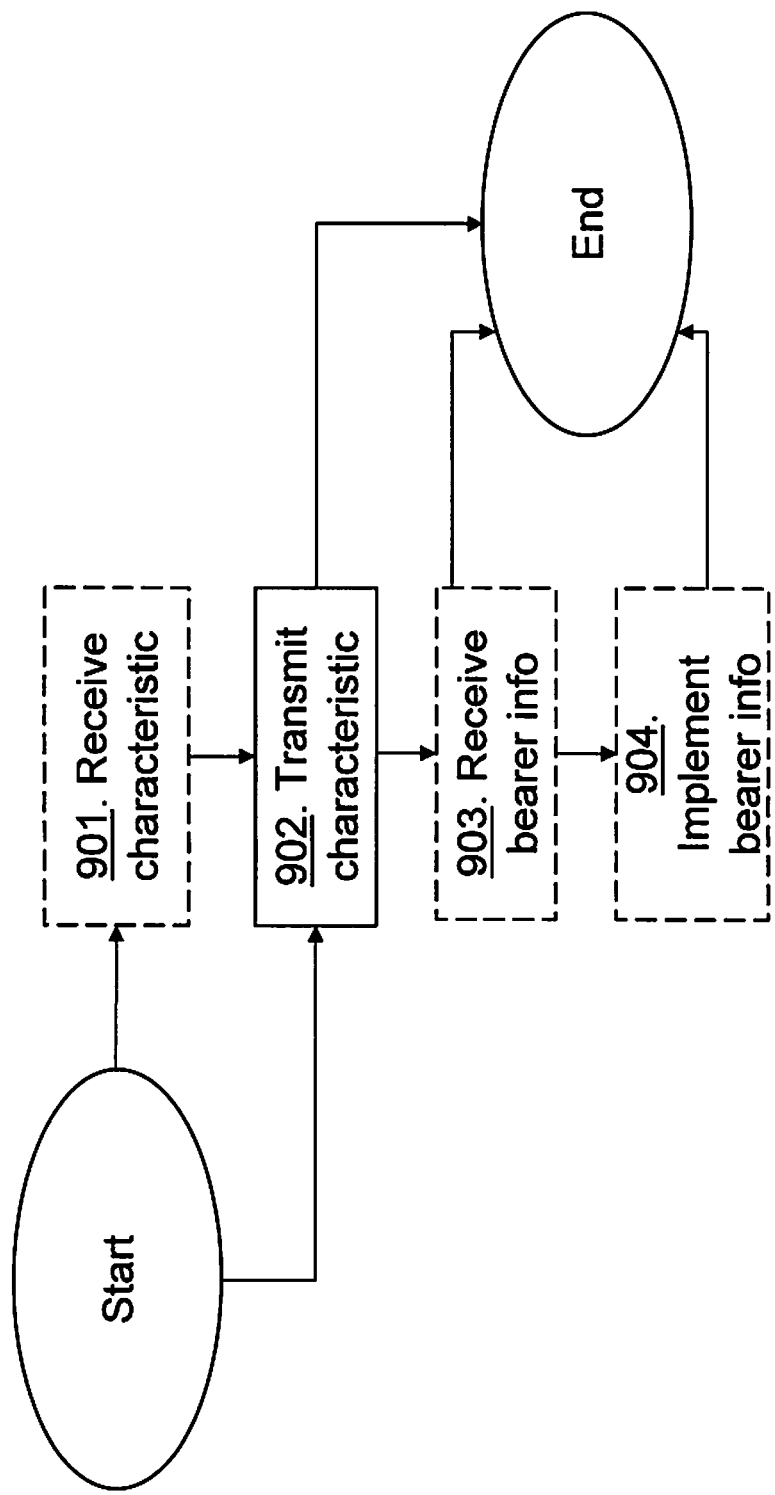
FIG. 9 is a flowchart of a method in a relay node.

The method steps in the relay node 10 for enabling configuring of bearer information associated with radio bearers in the radio communications network according to some general embodiments will now be described with reference to a flowchart depicted in FIG. 9. The relay node 10 serves the cell 11 and controls a number of first radio bearers R1 over a first radio interface between the relay node 10 and at least one user equipment 17 served in the cell 11. The donor radio base station 12 serves the relay node 10 and further controls a number of second radio bearers R2 over a second radio interface between the donor radio base station 12 and the relay node 10. The donor radio base station 12 and the relay node 10 are comprised in the radio communications network. The steps do not have to be taken in the order stated below, but may be taken in any suitable order.

Step 901. The relay node 10 receives the characteristic information indicating the characteristic of the relay node 10 from the operation and maintenance node 15,33 controlling the relay node 10. This step is performed in some embodiments as indicated by the dashed line. This step corresponds to step 501 in FIG. 5.

Step 902. The relay node 10 transmits the characteristic information indicating the characteristic of the relay node 10 to the donor radio base station 12 or the operation and maintenance node 15,33 controlling the relay node 10. The characteristic information enables the donor radio base station 12 to configure bearer information associated with at least one of the first radio bearers R1 and/or the second radio bearers R2. The characteristic information may indicate a certain type of relay node out of a number of types, a capability and/or capacity of the relay node 10. As stated above, the indicated characteristic may comprise information about size of the cell 11, output pilot or reference symbol power, cell range, the type of deployment, the intended type or amount of traffic in the cell 11, the desired quality of service value to be provided to user equipments behind the relay node 10, the relay node subscription and related quality of service value, if the cell 11 is open or closed access, and/or that the cell 11 is used at home, in public, or at corporate. The characteristic information may in some embodiments comprise a generic pointer to a pre-configured relay node type or mapping of radio bearers. An indexed table including mapping of the pointer to the pre-configured relay node type or the mapping of radio bearers may be stored in the donor radio base station 12. The mapping may be pre-configured or may be configured by an operation and maintenance system, or hard coded into the relay node as well as the donor radio base station 12.

The transmitting of the characteristic information may be triggered when e.g. the relay node is being configured into the radio communications network, upon request from the donor radio base station 12 or the operation and maintenance node 15,33, or upon reception of the characteristic information from the operation and maintenance node 15,33. The relay node 10 may transmit a suggested mapping scheme for mapping a data packet carried over a first radio bearer R1 to a second radio bearer R2 to the donor radio base station 12. The suggested mapping scheme may be received from the OAM node 15,33 during configuration, or may be generated in the relay node 10. This step is exemplified in step 502 in FIG. 5.

Step 903. The relay node 10 receives bearer information from the donor radio base station 12. The received bearer information comprises a mapping scheme indicating a mapping of packets over first radio bearers R1 to second radio bearers R2, number of second radio bearers R2 used, and/or a set Quality of Service value of the second radio bearers R2 based on the transmitted characteristic information. This step is performed in some embodiments as indicated by the dashed line. The bearer information may be received via operation and maintenance node 33 controlling the relay node 10 as shown in steps 405-406 in FIG. 4 and steps 504-505 in FIG. 5.

Step 904. The relay node 10 may implement the received bearer information into the relay node 10. This step is performed in some embodiments as indicated by the dashed line.

Figure 10:
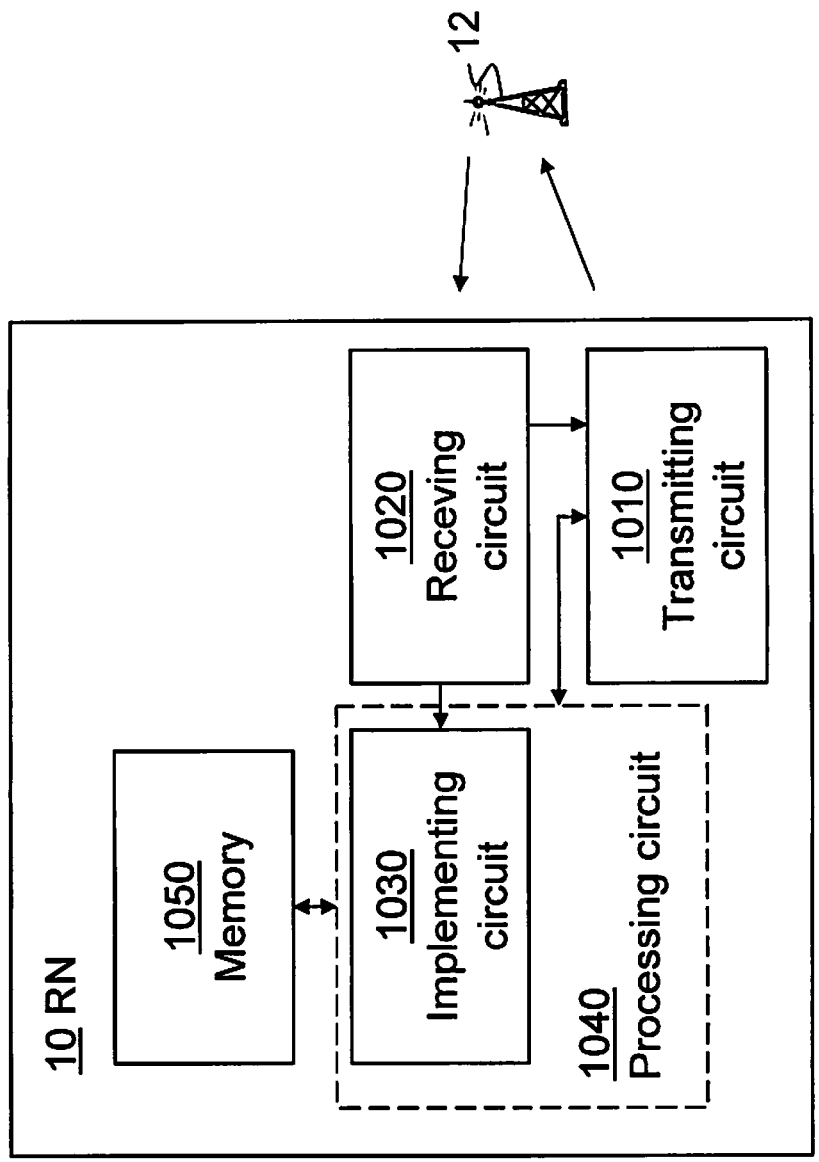
FIG. 10 is a block diagram depicting a relay node.

In order to perform the method steps for enabling configuring of bearer information associated with radio bearers in the radio communications network the relay node 10 comprises an arrangement depicted in FIG. 10. The relay node 10 is configured to serve a cell 11. The relay node 10 is further configured to control a number of first radio bearers R1 over a first radio interface between the relay node 10 and at least one user equipment 17 served in the cell 11. The donor radio base station 12 serves the relay node 10 and further controls a number of second radio bearers R2 over a second radio interface between the donor radio base station 12 and the relay node 10. The relay node comprises a transmitting circuit 1010 configured to transmit characteristic information indicating a characteristic of the relay node 10 to the donor radio base station 12 or an operation and maintenance node 15,33 controlling the relay node 10. The characteristic information enables the donor radio base station 12 to configure bearer information associated with at least one of the first radio bearers R1 and/or the second radio bearers R2. The transmitting circuit 1010 may further be configured to transmit a suggested mapping scheme for mapping a data packet carried over a first radio bearer R1 to a second radio bearer R2 to the donor radio base station 12. The indicated characteristic may be indicating a certain type of relay node out of a number of types. The indicated characteristic may comprise information about size of the cell 11, output pilot or reference symbol power, cell range, the type of deployment, the intended type or amount of traffic in the cell 11, the desired quality of service value to be provided to user equipments behind the relay node 10, the relay node subscription and related quality of service value, if the cell 11 is open or closed access, and/or that the cell 11 is used at home, in public, or at corporate. The characteristic information may comprise a generic pointer to a pre-configured relay node type or mapping of radio bearers stored in the donor radio base station 12. The mapping is pre-configured or is configured by an operation and maintenance system, or hard coded into the relay node 10. The transmitting circuit 1010 may be configured to be triggered to transmit the characteristic information when being configured into the radio communications network, upon request from the donor radio base station or the operation and maintenance node 15,33, or upon reception of the characteristic information from the operation and maintenance node 15,33.

The relay node 10 may further comprise a receiving circuit 1020 configured to receive bearer information from the donor radio base station 12. The received bearer information may comprise a mapping scheme indicating a mapping of packets over first radio bearers R1 to second radio bearers R2, number of second radio bearers R2 used, and/or a set Quality of Service value of the second radio bearers R2 based on the transmitted characteristic information. The receiving circuit 1020 may further be configured to receive the characteristic information indicating the characteristic of the relay node 10 from an operation and maintenance node 15,33 controlling the relay node 10.

The relay node 10 may also comprise an implementing circuit 1030 configured to implement the received bearer information into the relay node 10.

The embodiments herein for enabling configuring of bearer information associated with radio bearers in the radio communications network may be implemented through one or more processors, such as a processing circuit 1040 in the relay node depicted in FIG. 10, together with computer program code for performing the functions and/or method steps of the embodiments herein. The program code mentioned above may also be provided as a computer program product, for instance in the form of a data carrier carrying computer program code for performing the present solution when being loaded into the relay node 10. One such carrier may be in the form of a CD ROM disc. It is however feasible with other data carriers such as a memory stick. The computer program code may furthermore be provided as pure program code on a server and downloaded to the relay node 10.

Furthermore, the relay node 10 may comprise a memory 1050. The memory 1050 may comprise one or more memory units and may be used to store for example data such as radio bearer information, such as mapping info, UE EPS bearers to DSCP and DSCP to Un bearers, QoS values, characteristic information, application to perform the methods herein when being executed on the relay node 10 or similar.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a donor radio base station for configuring information associated with radio bearers in a radio communications network, wherein the donor radio base station controls a relay node that serves a cell and controls a number of first radio bearers over a first radio interface between the relay node and at least one user equipment served in the cell, and the donor radio base station further controls a number of second radio bearers over a second radio interface between the donor radio base station and the relay node, wherein the donor radio base station and the relay node are comprised in the radio communications network, the method comprising:

receiving characteristic information indicating a characteristic of the relay node, wherein the indicated characteristic includes information about at least one of:
  a size of the cell,
  output pilot or reference symbol power,
  cell range,
  a type of deployment,
  an intended type or amount of traffic in the cell,
  whether the cell is open or closed access, and
  whether the cell is used at home, in public, or at a corporate location;
configuring bearer information associated with at least one of the first radio bearers or the second radio bearers based on the indicated characteristic in the received characteristic information, wherein the configured bearer information is utilized in the radio communications network during operation, and the configured bearer information includes a mapping scheme based on the indicated characteristic, the mapping scheme indicating at least one of:
  a mapping of packets over the first radio bearers to the second radio bearers,
  a number of second radio bearers (R2) used, and
  a set Quality of Service value of the second radio bearers; and
transmitting the configured bearer information to the relay node, an operation and maintenance node, or a controlling node controlling the relay node.

2. The method according to claim 1, further comprising:
implementing the configured bearer information in the donor radio base station.

3. A method in a relay node for enabling configuring of bearer information associated with radio bearers in a radio communications network, wherein the relay node serves a cell and controls a number of first radio bearers over a first radio interface between the relay node and at least one user equipment served in the cell, and wherein the donor radio base station serves the relay node and further controls a number of second radio bearers over a second radio interface between the donor radio base station and the relay node, and wherein the relay node and donor radio base station are comprised in the radio communications network, the method comprising:

transmitting characteristic information indicating a characteristic of the relay node to the donor radio base station or an operation and maintenance node controlling the relay node, wherein the characteristic information enables the donor radio base station to configure bearer information associated with at least one of the first radio bearers or at least one of the second radio bearers, wherein the characteristic information includes information about at least one of:
  a size of the cell,
  output pilot or reference symbol power,
  cell range,
  a type of deployment,
  an intended type or amount of traffic in the cell,
  whether the cell is open or closed access, and
  whether the cell is used at home, in public, or at a corporate location;
receiving bearer information from the donor radio base station, wherein the received bearer information includes a mapping scheme based on the indicated characteristic, the mapping scheme indicating at least one of:
  a mapping of packets over the first radio bearers to the second radio bearers,
  a number of second radio bearers used, and
  a set Quality of Service value of the second radio bearers based on the transmitted characteristic information; and
implementing the received bearer information into the relay node.

4. The method according to claim 3, further comprising:
receiving the characteristic information indicating the characteristic of the relay node from an operation and maintenance node controlling the relay node.

5. A donor radio base station for configuring information associated with radio bearers in a radio communications network, wherein the donor radio base station is configured to control a relay node configured to serve a cell and to control a number of first radio bearers over a first radio interface between the relay node and at least one user equipment served in the cell, and the donor radio base station is further configured to control a number of second radio bearers over a second radio interface between the donor radio base station and the relay node, the donor radio base station comprises:

a receiving circuit configured to receive characteristic information indicating a characteristic of the relay node, wherein the indicated characteristic includes information about at least one of:
  a size of the cell,
  output pilot or reference symbol power,
  cell range,
  a type of deployment,
  an intended type or amount of traffic in the cell,
  whether the cell is open or closed access, and
  whether the cell is used at home, in public, or at a corporate location;
a configuring circuit adapted to configure bearer information associated with at least one of the first radio bearers or the second radio bearers based on the indicated characteristic in the received characteristic information, wherein the configured bearer information is utilized in the radio communications network during operation, and the configured bearer information includes a mapping scheme based on the indicated characteristic, the mapping scheme indicating at least one of:
  a mapping of packets over the first radio bearers to the second radio bearers,
  a number of second radio bearers (R2) used, and
  a set Quality of Service value of the second radio bearers; and
a transmitting circuit configured to transmit the configured bearer information to the relay node, an operation and maintenance node, or a controlling node controlling the relay node.

6. The donor radio base station according to claim 5, further comprising:
an implementing circuit configured to implement the configured bearer information in the donor radio base station.

7. The donor radio base station according to claim 5, wherein the received characteristic information is received from the relay node or received from an operation and maintenance node, wherein the operation and maintenance node controls the donor radio base station.

8. The donor radio base station according to claim 5, wherein the received characteristic information includes a generic pointer to a pre-configured relay node type or a mapping of radio bearers stored in the donor radio base station, wherein the mapping is pre-configured or is configured by an operation and maintenance system, or hard coded into the donor radio base station.

9. A relay node for enabling configuring of bearer information associated with radio bearers in a radio communications network, wherein the relay node is configured to serve a cell and to control a number of first radio bearers over a first radio interface between the relay node and at least one user equipment served in the cell, and wherein the donor radio base station is configured to serve the relay node and further to control a number of second radio bearers over a second radio interface between the donor radio base station and the relay node, the relay node comprising:
a transmitting circuit configured to transmit characteristic information indicating a characteristic of the relay node to the donor radio base station or an operation and maintenance node controlling the relay node, wherein the characteristic information enables the donor radio base station to configure bearer information associated with at least one of the first radio bearers or at least one of the second radio bearers, wherein the characteristic information includes information about at least one of:
a size of the cell,
output pilot or reference symbol power,
cell range,
a type of deployment,
an intended type or amount of traffic in the cell,
whether the cell is open or closed access, and
whether the cell is used at home, in public, or at a corporate location;
a receiving circuit configured to receive bearer information from the donor radio base station, wherein the received bearer information includes a mapping scheme based on the indicated characteristic, the mapping scheme indicating at least one of:
a mapping of packets over the first radio bearers to the second radio bearers,
a number of second radio bearers used, and
a set Quality of Service value of the second radio bearers based on the transmitted characteristic information; and
an implementing circuit configured to implement the received bearer information into the relay node.

10. The relay node according to claim 9, wherein the receiving circuit is further configured to receive the characteristic information indicating the characteristic of the relay node from an operation and maintenance node controlling the relay node.

11. The relay node according to claim 9, wherein the characteristic of the relay node indicates a certain type of relay node out of a number of types.

12. The relay node according to claim 9, wherein the characteristic information includes a generic pointer to a pre-configured relay node type or mapping of radio bearers in the donor radio base station, wherein the mapping is pre-configured or is configured by an operation and maintenance system, or hard coded into the relay node.

13. The relay node according to claim 9, wherein the transmitting circuit is further configured to be triggered to transmit the characteristic information when being configured into the radio communications network, upon request from the donor radio base station or the operation and maintenance node, or upon reception of the characteristic information from the operation and maintenance node.

\* \* \* \* \*

UNITED STATES PATENT AND TRADEMARK OFFICE
CERTIFICATE OF CORRECTION

| | | |
|---|---|---|
| PATENT NO. | : 9,282,565 B2 | Page 1 of 1 |
| APPLICATION NO. | : 14/004853 | |
| DATED | : March 8, 2016 | |
| INVENTOR(S) | : Mildh et al. | |

It is certified that error appears in the above-identified patent and that said Letters Patent is hereby corrected as shown below:

IN THE SPECIFICATION

In Column 14, Line 14, delete "memory 805." and insert -- memory 806. --, therefor.

Signed and Sealed this
Thirty-first Day of May, 2016

Michelle K. Lee
*Director of the United States Patent and Trademark Office*